United States Patent
Patel et al.

(10) Patent No.: US 8,612,382 B1
(45) Date of Patent: Dec. 17, 2013

(54) RECOVERING FILES IN DATA STORAGE SYSTEMS

(75) Inventors: Dixitkumar Vishnubhai Patel, Monroe, NJ (US); Srinivasa Rao Vempati, Upton, MA (US); Jean Pierre Bono, Westborough, MA (US); James Jiaming Pan, Beijing (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,754

(22) Filed: Jun. 29, 2012

(51) Int. Cl.
*G06F 17/30* (2006.01)

(52) U.S. Cl.
USPC .......................................... 707/609; 707/639

(58) Field of Classification Search
USPC ................................................ 707/609, 639
See application file for complete search history.

(56) References Cited

U.S. PATENT DOCUMENTS

| | | | |
|---|---|---|---|
| 7,941,709 B1 * | 5/2011 | Hong et al. | 714/54 |
| 7,991,973 B2 * | 8/2011 | Jacobson et al. | 711/162 |
| 8,407,265 B1 * | 3/2013 | Scheer et al. | 707/823 |
| 8,429,307 B1 * | 4/2013 | Faibish et al. | 710/5 |
| 8,442,952 B1 * | 5/2013 | Armangau et al. | 707/686 |
| 2003/0131104 A1 * | 7/2003 | Karamanolis et al. | 709/225 |
| 2006/0129614 A1 * | 6/2006 | Kim et al. | 707/202 |
| 2009/0276593 A1 * | 11/2009 | Jacobson et al. | 711/162 |
| 2010/0082547 A1 * | 4/2010 | Mace et al. | 707/648 |

* cited by examiner

*Primary Examiner* — Kim Nguyen
(74) *Attorney, Agent, or Firm* — Krishnendu Gupta; Deepika Bhayana

(57) ABSTRACT

A method is used in recovering files in data storage systems. A set of file system blocks of a file of a file system is identified. The set of file system blocks are associated with a portion of an inode of the file of the file system. Mapping information associated with the portion of the inode is missing references to the set of file system blocks. Metadata of each file system block of the set of file system blocks is evaluated. Based on the evaluation, the portion of the inode of the file is recovered by updating mapping information associated with the portion of the inode.

18 Claims, 11 Drawing Sheets

LOGICAL VIEW MAPPED TO FILESYSTEM BLOCKS

RECOVERING FILES IN DATA STORAGE SYSTEMS

BACKGROUND

1. Technical Field

This application relates to recovering files in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/

0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file. The sharing of file system data blocks conserves data storage for storing files in a data storage system. The snapshot copy facility is a space saving technology that enables sharing of file system data blocks among versions of a file.

SUMMARY OF THE INVENTION

A method is used in recovering files in data storage systems. A set of file system blocks of a file of a file system is identified. The set of file system blocks are associated with a portion of an inode of the file of the file system. Mapping information associated with the portion of the inode is missing references to the set of file system blocks. Metadata of each file system block of the set of file system blocks is evaluated. Based on the evaluation, the portion of the inode of the file is recovered by updating mapping information associated with the portion of the inode.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
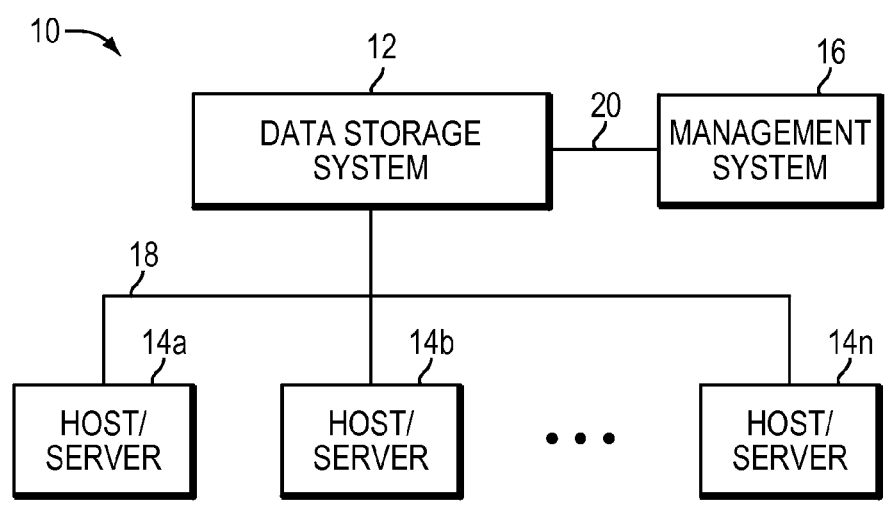
FIGS. 1-3 are examples of an embodiment of a computer system that may utilize the techniques described herein.

Described below is a technique for use in recovering files in data storage systems, which technique may be used to provide, among other things, identifying a set of file system blocks of a file of a file system, where the set of file system blocks are associated with a portion of an inode of the file of the file system, where mapping information associated with the portion of the inode is missing references to the set of file system blocks, evaluating metadata of each file system block of the set of file system blocks, and based on the evaluation, recovering the portion of the inode of the file by updating mapping information associated with the portion of the inode.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

A file-system based snapshot copy facility needs a way of maintaining block ownership information for indicating whether or not each indirect block or data block of a file or a snapshot copy ("replica" or "version") of the file is shared with another version of the file. This block ownership information is accessed each time that the snapshot copy facility writes new data to a file, and each time that the snapshot copy facility deletes a snapshot copy. Further, as introduced above, files in a data storage system are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Further, a file and snapshot copies of the file are collectively referred to as a version set. Similarly, the inode of a file and snapshot copies of the inode are collectively referred to as a version set inodes.

Thus, initially when a snapshot copy of a file is created, the snapshot copy of the file shares the entire file system block hierarchy of the file because mapping pointers of the inode of the file are copied to the inode of the snapshot copy of the file (referred to as "snapshot copy inode"). Further, if a write I/O operation is performed on a data block of a file for which a snapshot copy has been created, a write split operation breaks the sharing relationship of the data block of the file with the snapshot copy of the file and allocates a new data block for the write I/O request thereby creating a split in the shared file system block hierarchy of the file. Thus, as write operations are performed on a file for which a snapshot copy has been created, only a subset of file system block hierarchy of the file remains shared between the inode of the file and the snapshot inode of the snapshot copy of the file after the write operations are completed on the file.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

The FSCK utility for feature software recovers a data block shared between a file and a replica of the file by using the logical offset (e.g., logical block number) of the data block. When a data block is shared between a file and a replica of the file, the data block has the same logical offset whether the data block is accessed from the file or the replica of the file. The shared data block is recovered using the logical offset of the data block because a replica of the file shares the data block at the same logical offset. Thus, generally, the inode of a snapshot copy of a file share a portion of a file system block hierarchy of the inode of the file such that a data block that is shared between file and the snapshot copy of the file is located at the same logical offset within the inode and the snapshot copy of the inode.

Generally, in typical file systems, inodes, which include the metadata for a file, are stored alongside the data that comprises the content of the file in a physical storage media (e.g. disks) in a data storage system. As such, physical storage devices store both the data itself and the file system metadata that is related to it. For example, file systems may divide file system storage space of a file system into cylinders that include a certain amount of storage, e.g., 64 MB of storage space. Furthermore, each cylinder is managed to track physical blocks within it that are free or already allocated and inode structures that are free or already allocated. Thus, each cylinder includes a cylinder group map block including metadata that includes this information and maps inodes to physical block numbers in the cylinder. Further, each file system block of a file of a file system is associated with a per block metadata (also referred to herein as "BMD") that stores metadata for the file system block and maintains information regarding the file system block such as the logical offset at which the file system block has been allocated, whether the file system block has been shared by the inode and snapshot copies of the inode and so on. Further, metadata of a file system may include inodes and indirect blocks.

The loss or corruption of any of numerous types of metadata in a system such as that described above can result in inconsistencies or corruption of a file system. For example, assume that metadata within one or more cylinders that keeps track of which blocks of storage or inodes are free and which are allocated is corrupted or lost. Without such metadata, the file system is unable to write additional files, as a determination needs to be made to identify a free inode structure and a sufficient number of free data blocks. As another example, if the metadata for a particular inode is lost or corrupted, it may not be possible to access the corresponding file. As yet a further example, metadata in the file system may be corrupted so that two or more inodes both indicate that they own the same data block, resulting in inconsistencies regarding which inode actually does own the data block and has the ability to control and overwrite it. It should be appreciated that such corruptions or inconsistencies may develop in any one of numerous ways, including hardware failures, software bugs, and so on. In addition, it should be appreciated that the types of inconsistencies and problems with the file systems mentioned above are described merely for illustrative purposes, and that numerous other types of inconsistencies or problems are possible.

Generally, one mechanism for recovering files of a file system from corruption or inconsistencies is to create one or more copies of metadata of the file system such that if the file system is unable to access a primary copy of the metadata, a duplicate copy of the metadata is used by the file system. Thus, a data storage system may store a duplicate copy of the inode of a file of a file system such that if the file system is unable to access a primary copy of the inode, a duplicate copy of the inode is used by the file system.

Conventionally, if the inode of a file of a file system is lost or corrupted, a FSCK utility may recover the file using a duplicate copy of the inode. However, in such a conventional system, if both the inode of a file and a duplicate copy of the inode are lost or corrupted, it is difficult or impossible for the FSCK utility to recover the file. Thus, in such a conventional system, even if only a small portion of metadata stored in the inode of a file is lost or corrupted, it is difficult or impossible for a FSCK utility to recover the file upon encountering a double fault indicating loss of both the inode of the file and the duplicate copy of the inode. Similarly, in such a conventional system, if an indirect block of a file of a file system and a duplicate copy of the indirect block are lost and corrupted, it is difficult or impossible for a conventional FSCK utility to recover data and metadata associated with a logical range represented by the indirect block. Consequently, in such a conventional system, if a FSCK utility is unable to recover a file, a user may lose a large portion of enterprise data thereby causing a data loss or unavailability of the enterprise data.

By contrast, in at least some implementations in accordance with the technique as described herein, a FSCK utility recovers a file by recovering the inode of the file even if both the inode and a duplicate copy of the inode are lost or corrupted. In at least one embodiment of the current technique, a FSCK utility recovers the inode of a file by associating each file system block of a set of file system blocks that are not mapped due to a problem such as corruption in the inode to a logical offset of the inode using metadata information for the file system block. Further, if a portion of the inode of a file is lost or corrupted in such a way that the portion is unrecoverable by a FSCK utility, the FSCK utility recovers rest of the file in such a way that only that portion of the file which is associated with the corrupted portion of the inode remains inaccessible.

Further, in at least one embodiment of the current technique, if a file system does not include any snapshot copies of a file of the file system, a FSCK utility maps each file system block of a set of file system blocks that have been determined to be lost by using owner information from the per block metadata of each file system block. A file system block is determined as a lost file system block (also referred to herein as "orphan") if the file system block is not mapped to any inode of a file system. Thus, if an indirect block of the inode of a file of a file system is lost or corrupted indicating that a logical range represented by the indirect block is lost but metadata of file system blocks associated with the logical range is not corrupted, a FSCK utility reconstruct a file system block tree hierarchy for the indirect block in order to recover the indirect block of the file thereby recovering the logical range of the indirect block that has been corrupted or lost.

Further, in at least one embodiment of the current technique, a version set may be a set of inodes organized as a group such that the set of inodes includes the inode of a file and snapshot copies of the inode. If one or more snapshot copies of an inode of a version set share a portion of a file system block tree hierarchy of the inode and only one inode of the version set is lost or corrupted, a FSCK utility may be able to completely recover the inode by using a weighted reference count information stored in per block metadata of each file system block that is part of the file system block tree hierarchy represented by the inode. Thus, in such a case, the FSCK utility reconnects a shared file system block to snapshot copies of the inode that refer to the shared file system block by updating mapping of the snapshot copies of the inode.

In at least some implementations in accordance with the technique as described herein, the use of the recovering files in data storage systems technique can provide one or more of the following advantages: reducing the amount of time required for recovering a file system by efficiently recovering metadata of the file system, preventing loss of user data by reconstructing an inode that has been lost or corrupted, and preventing unavailability of user data by efficiently recovering files of a file system.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
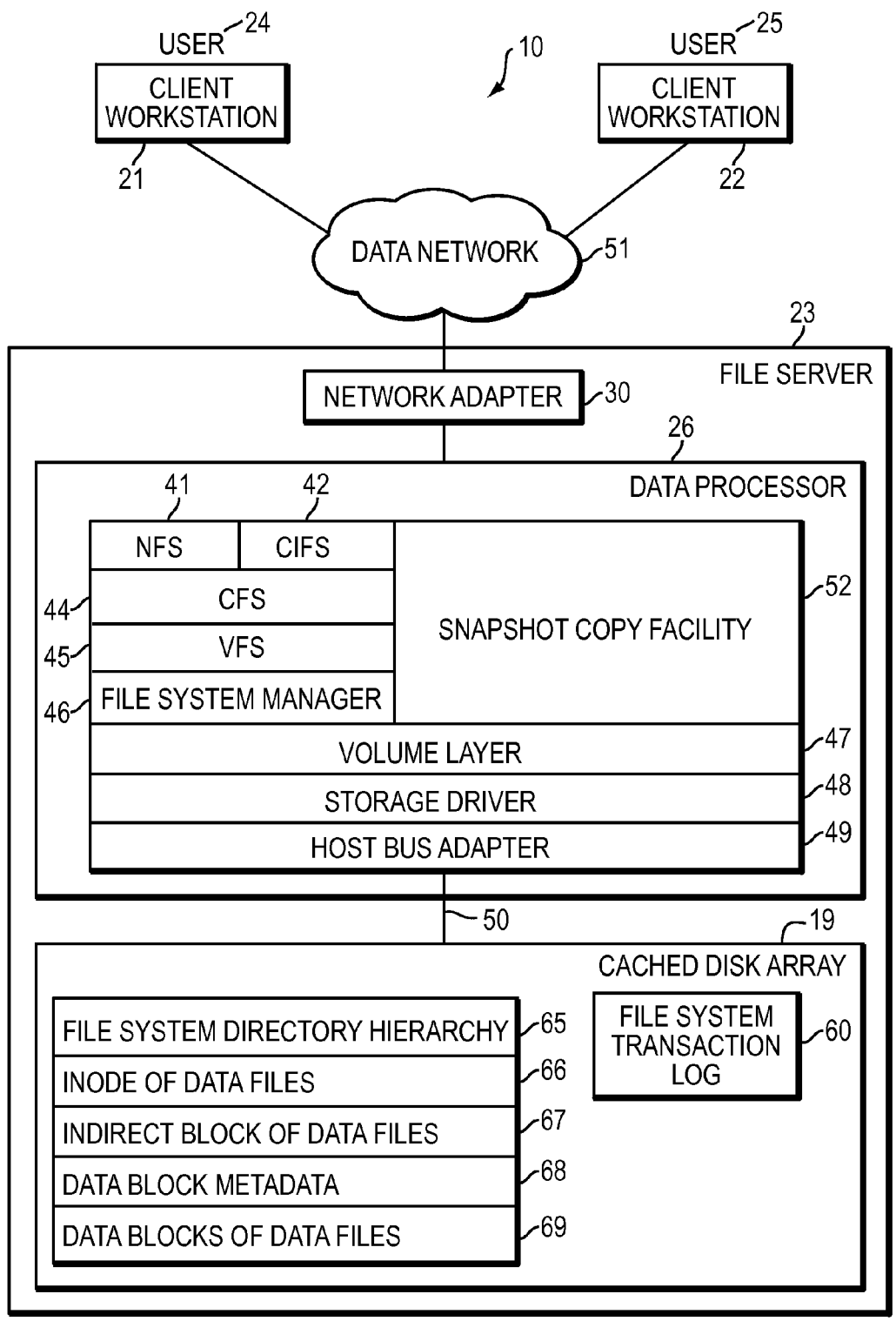

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 7 and 8. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
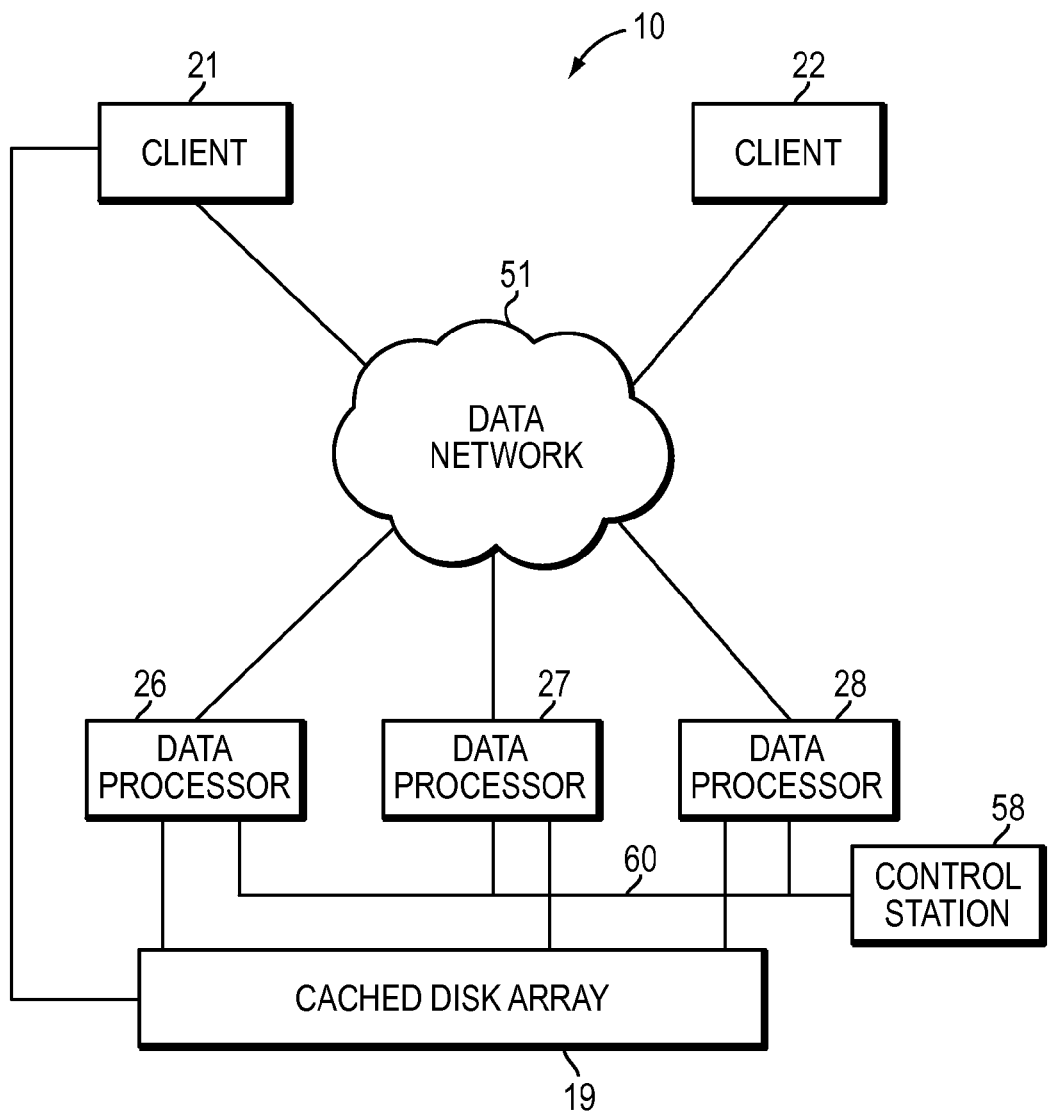

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
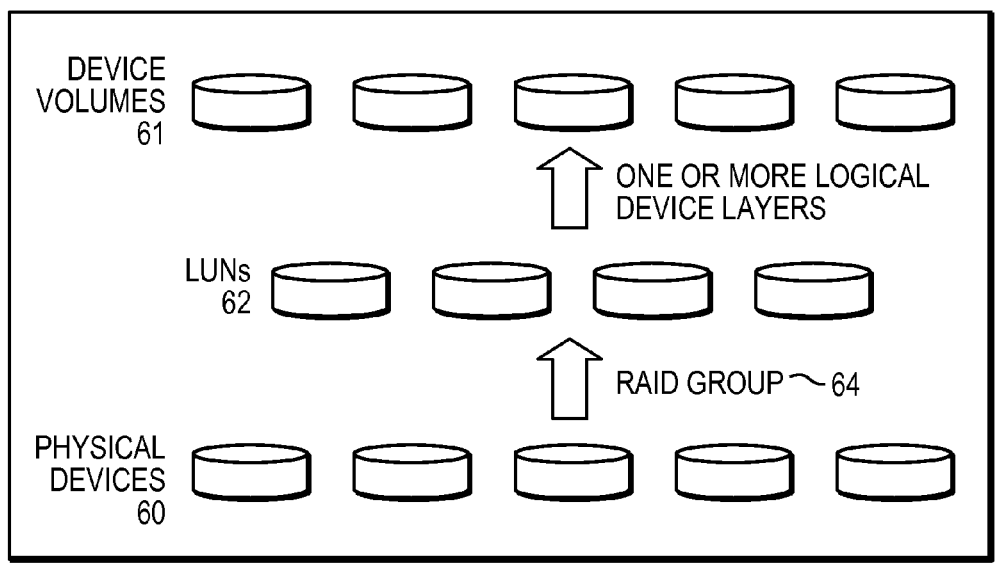
FIGS. 4-10 are diagrams illustrating in more detail components that may be used in connection with techniques herein.

FIG. 4 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 5:
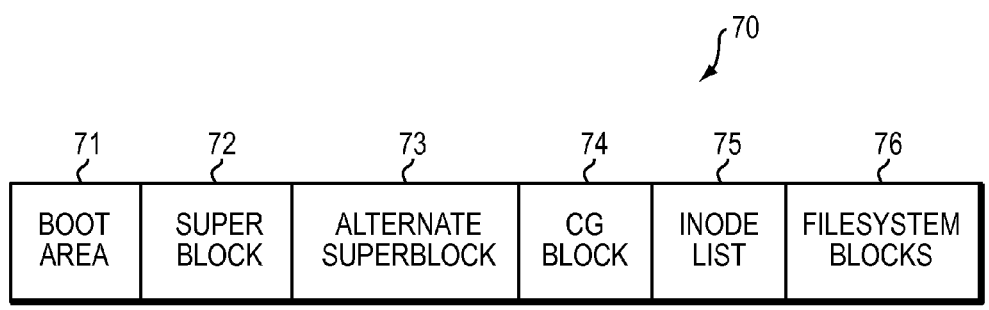

Referring to FIG. 5, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 6:
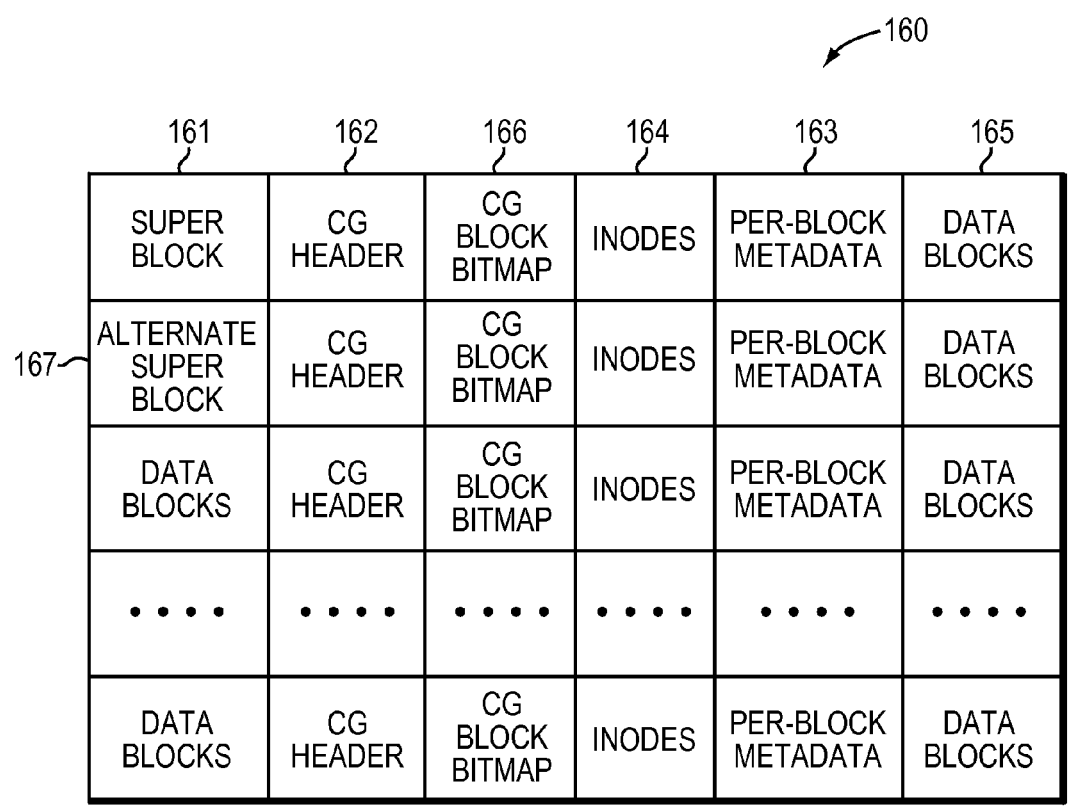

Referring to FIG. 6, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 6, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 6) that may be included in a file system stored in data storage system 10.

Figure 7:
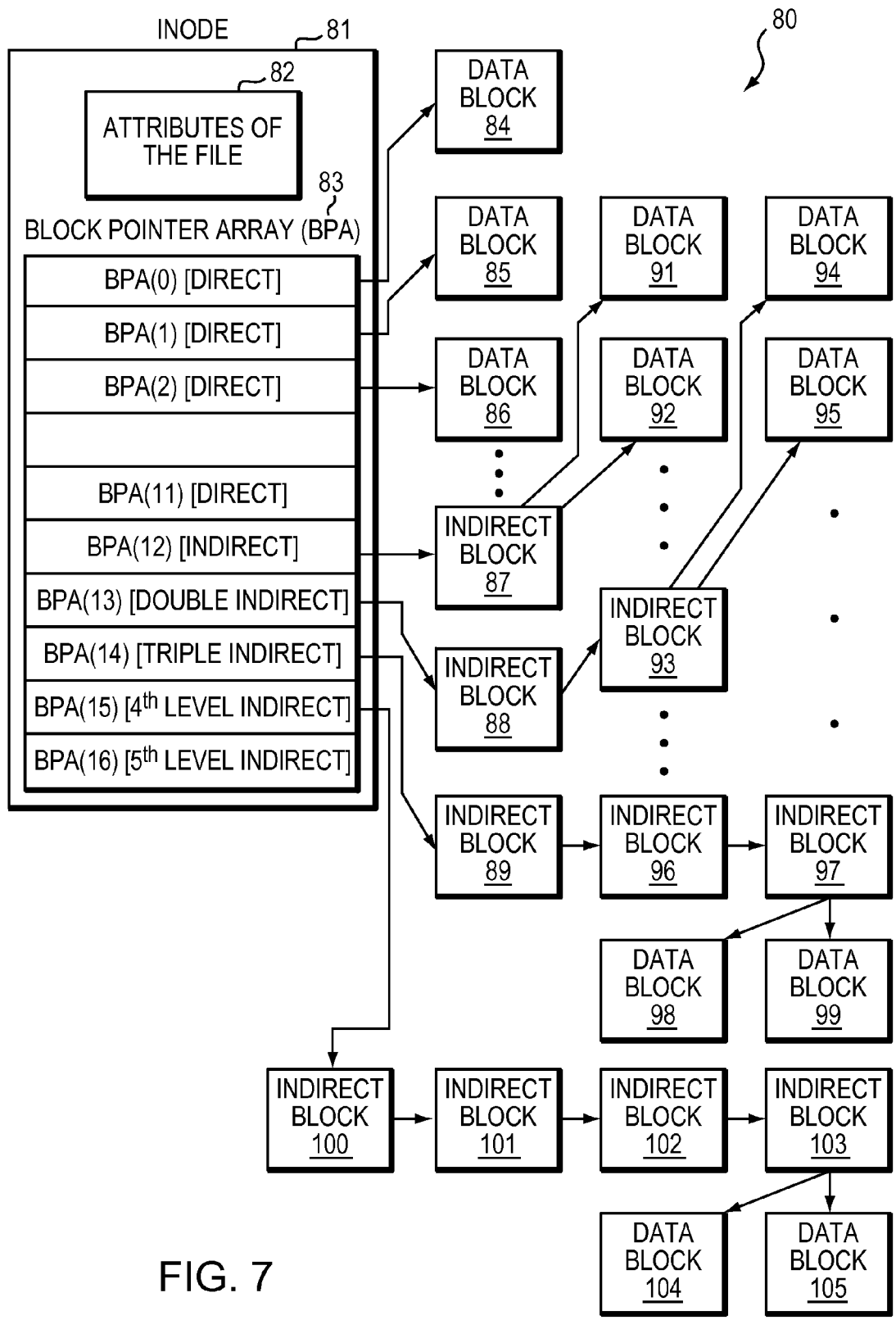

Referring to FIG. 7, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 8:
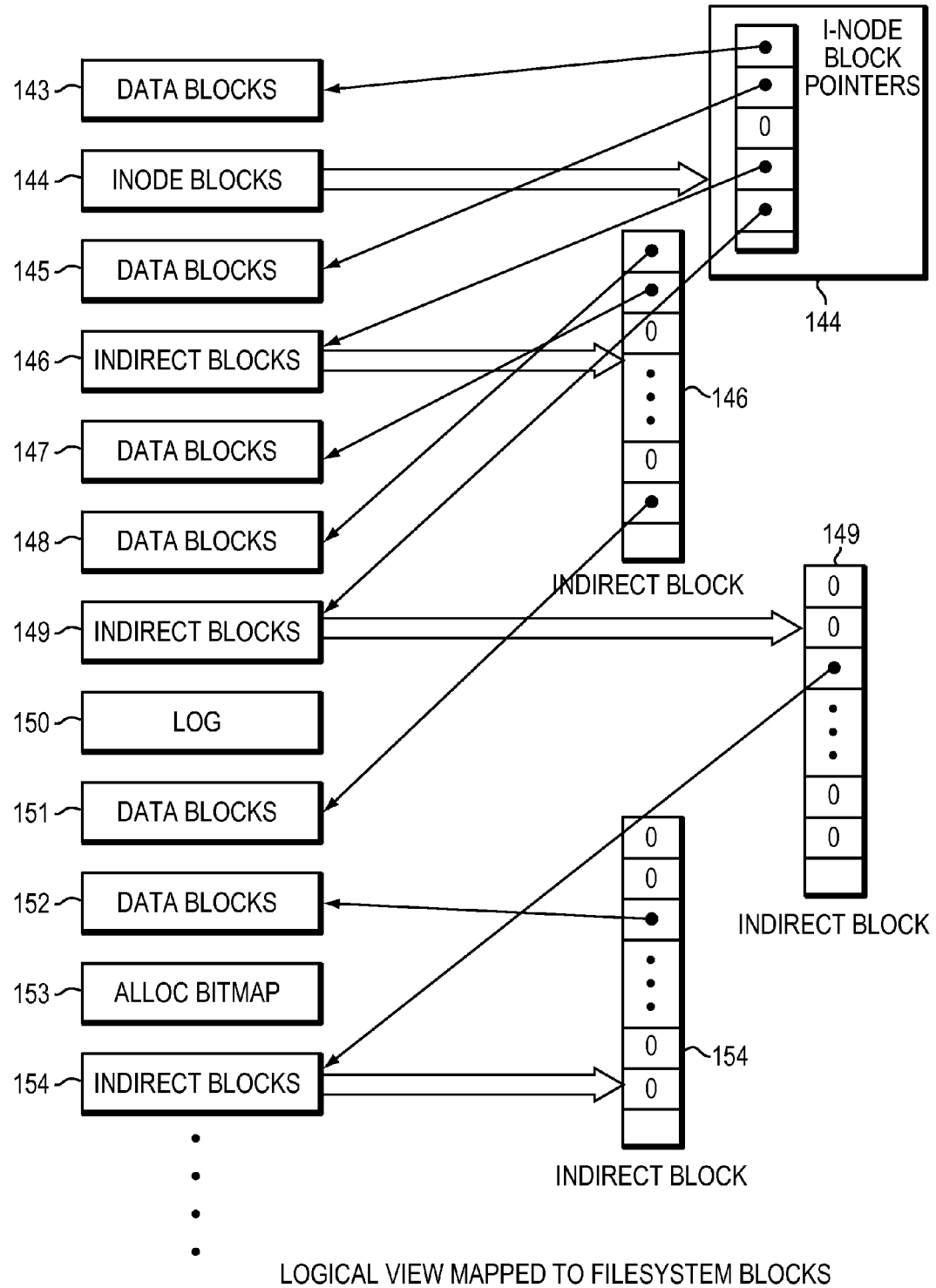

Referring to FIG. 8, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 9:
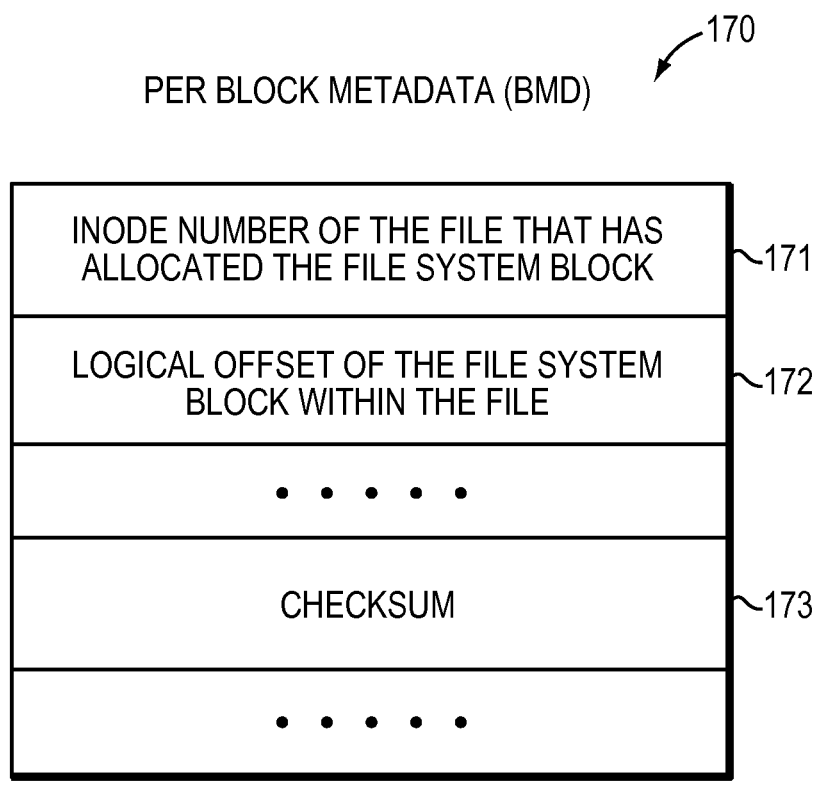

Referring to FIG. 9, shown is a representation of a per block metadata (also referred to as "BMD") for a file system data block that may be included in an embodiment using the techniques described herein. The per-block metadata 170 for a file system data block includes an inode number 171 of a file of the file system to which the data block has been allocated, the file system data block number and the logical offset of the file system data block 172. The per-block metadata 170 for a file system data block also includes an internal checksum 173 for protecting the integrity of the information stored in the per-block metadata 170. The per-block metadata for a file system data block may further include the state of the per-block metadata 170.

Figure 10:
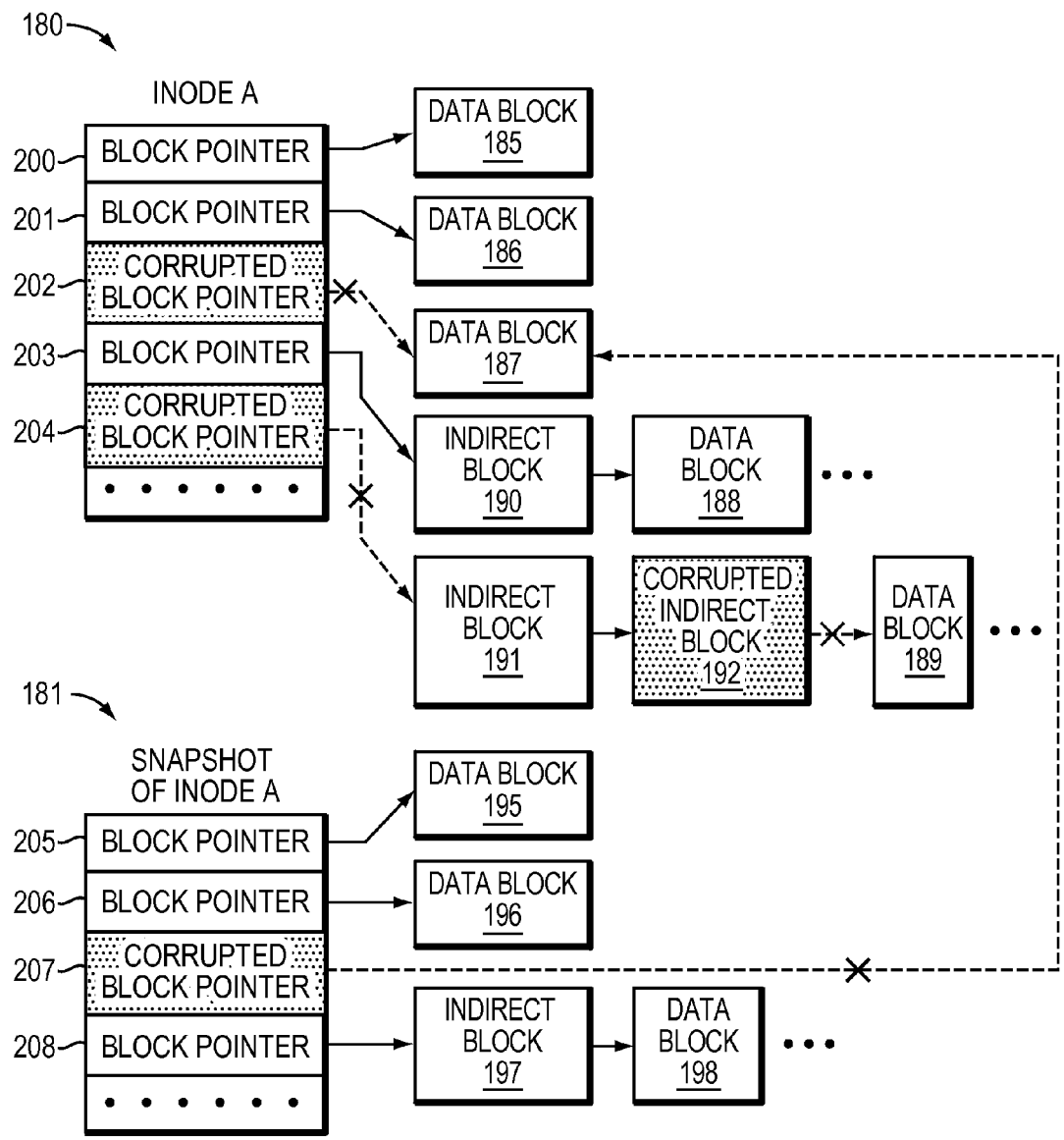

Referring to FIG. 10, shown is a detailed representation of components that may be included in an embodiment using the techniques described herein. FIG. 10 illustrates an example file system block hierarchy of a file (e.g., file "A") of a file system represented by inode "A" 180. The inode A 180 includes block pointers 200-204 that refers to a file system block tree hierarchy represented by indirect blocks 190-192 and data blocks 185-189. For example, block pointers 202 and 204 of inode A 80 may become corrupted. Thus, the file system is unable to access data block 187 and a sub tree block hierarchy of indirect blocks 191-192 including data block 189. Further, for example, indirect block 192 may become corrupted or lost or damaged. In such a case, the file system is unable to access data block 189. In such a case, if the duplicate copy of the inode A 180 is lost or corrupted and no snapshot copy exists for the inode A 180, a FSCK utility may be able to recover corrupted block pointers 202, 204 and corrupted indirect block 192 by evaluating per block metadata of data blocks 187, 189 and indirect block 191.

Further, a snapshot copy of the file A may be created by creating a version file such that snapshot inode 181 is associated with the snapshot copy of the file A. Further, data block 187 may be shared between inode A 180 and snapshot inode A 181 at the same logical offset within respective inodes indicated by block pointers 202, 207 respectively. Further, block pointer 207 of snapshot inode A 181 may become lost, corrupted or damaged. In such a case, data block 187 that includes two references indicated by block pointers 202, 207 may be recovered and mapped to block pointers 202 and 207 because in such a case the corruption includes the same pattern and is located at the same logical offset indicating a single shared corruption scenario.

Figure 11:
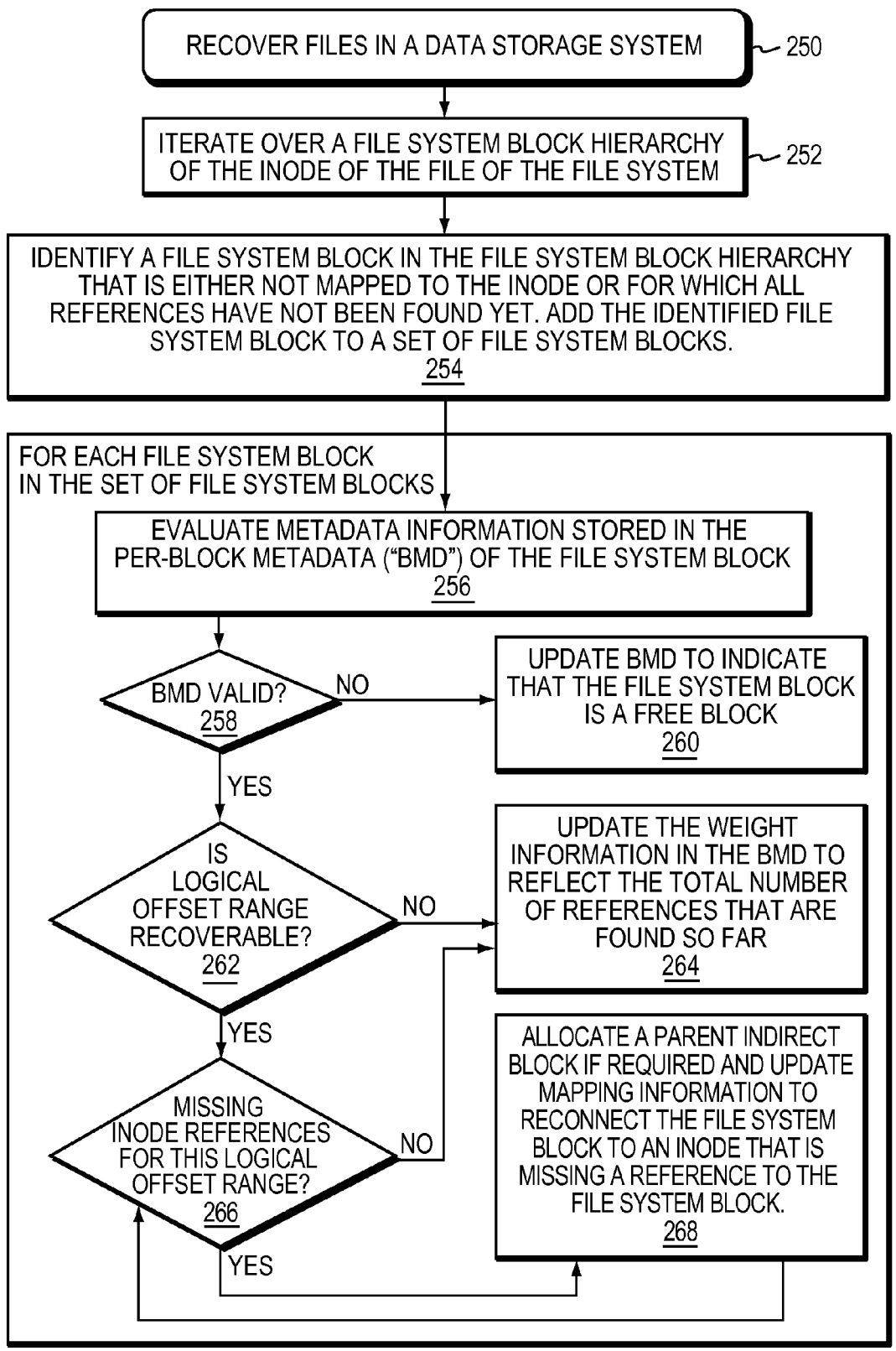
FIG. 11 is a flow diagram illustrating processes that may be used in connection with techniques herein.

Referring to FIG. 11, shown is a flow diagram illustrating the method of recovering files in data storage systems. With reference also to FIGS. 1-10, in at least one embodiment of the current technique, the inode of a file of a file system is recovered by a FSCK utility (250). The FSCK utility iterates over a file system block hierarchy of each inode of the file system (step 252). During iteration, the FSCK utility gathers metadata information for each file system block of each file system block hierarchy in the file system and creates metadata structures such as bitmaps for recovering inconsistent metadata. Further, during iteration, the FSCK utility identifies a set of lost file system blocks (also referred to herein as "orphan file system blocks") (step 254). The FSCK utility determines a file system block as a lost file system block if the file system block is not mapped to any inode of the file system or for which all owner references have not been found. A owner reference (also referred to herein as "distributed weight" or "weighted reference count" or simply "weight") is a mechanism for sharing a file system block between an inode and snapshot copies of the inode. The FSCK utility then attempts to recover lost or corrupted portions of files of the file system by processing each lost file system block of the set of lost file system blocks in order to reconnect each lost file system block to a mapping pointer of an inode or an indirect block. For each lost file system block, the FSCK utility evaluates metadata information stored in the per block metadata of the lost file system block (step 256). A determination is made as to whether the per block metadata for the lost file system block is valid (step 258). Validity of the per block metadata may be determined by computing and verifying checksum information. If the per block metadata of the lost file system block is not valid, the lost file system block is determined as a unrecoverable file system block which is not reconnected to any inode of the file system. Further, the per block metadata of the lost file system block is updated to indicate that the file system block is a free block which may be reused by the file system (step 260). However, if the per block metadata of the lost file system block is valid, a determination is made as to whether the logical offset range associated with the lost file system block is recoverable (step 262). If the file system does not include snapshot copies, a logical offset range is determined to be recoverable. However, if the file system includes snapshot copies of the inode of a file, an overlapping corruption indicating different corruption pattern at the same logical offset within two or more corrupted inodes is determined to be unrecoverable. However, an overlapping corruption indicating the same corruption pattern at the same logical offset within two or more inodes is determined to be recoverable. Further, if the file system includes snapshot copies of the inode of a file, a non-overlapping corruption indicating corruption at different logical offsets within two or more inodes is determined to be recoverable.

In at least one embodiment of the current technique, if the logical offset range associated with the lost file system block at step 262 is determined to be unrecoverable, the weight information in the per block metadata of the lost file system block is updated to indicate the total number of owner references that has been found so far (step 264). However, if the logical offset range associated with the lost file system block is determined to be recoverable, a determination is made as to whether the lost file system block is missing (also referred to herein as "leaking") any inode references (step 266). A determination regarding whether a file system block is missing any inode references is made by evaluating and comparing weight information stored in the per block metadata of the file system block and the mapping pointer associated with the file system block by using the delegated reference counting mechanism described above herein. Further, if the lost file system block is not missing any inode references, the weight information in the per block metadata of the lost file system block is updated to indicate the total number of owner references that has been found so far (step 264). However, if the lost file system block is missing any inode references, a parent indirect block is allocated if required and mapping information of the inode is updated to reconnect the lost file system block to the inode that has been missing a reference to the lost file system block (step 268). The step of reconnecting the lost file system block to the inode that has been missing a reference is performed as many time as the total number of missing references by iterating over a set of inodes such that each inode of the set of inodes includes a lost or corrupted portion of logical range matching the logical offset of the lost file system data block.

Thus, in at least one embodiment of the current technique, a FSCK utility may completely recover the inode of a file of a file system even when the duplicate copy of the inode has been lost or corrupted. Further, if the file system includes snapshot copies of the inode of a file of a file system, the FSCK utility reconnects lost data blocks and indirect blocks that have been shared between snapshot copies of the inode and the inode by recovering the inode and snapshot copies of the inode based on a non-overlapping logical offset range that has been lost or corrupted. Further, when the FSCK utility detects a damaged indirect block (also referred to herein as "lost" or "corrupted"), the FSCK utility gathers additional information into a parent block pointer of the indirect block and upon finding additional inodes in the file system that shares the same corrupted indirect block, determines the corruption as a single shared corruption and reconnects the a file system block tree hierarchy represented by the damaged indirect block to each snapshot inode that shares the damaged indirect block.

Further, in at least one embodiment of the current technique, a FSCK utility iterates over a file system hierarchy of each allocated inode of a file system and validates block pointers of each allocated inode. Upon detecting any corruption in an allocated inode of the file system, the FSCK utility attempts to recover a logical offset at which a corrupted block pointer has been found and record the corruption information for recovering the corrupted block pointer at a later time if the corruption is not recoverable during that time. It should be noted that a FSCK utility executes in one or more phases.

In at least one embodiment of the current technique, during the first phase of a FSCK utility, the FSCK utility iterates over a file system block hierarchy of each inode of a file system and validates block pointers of each inode of the file system. The FSCK utility creates metadata structures for gathering and storing information required for recovering files of the file system. The information may include information regarding which file system blocks are free and which file system blocks are allocated, which references of a file system block have been verified and which references of a file system block have not been verified. It should be noted that the information may be stored in memory, on a storage device or a swap space organized on a storage device. Further, the FSCK utility maintains information regarding how many references for a file system block has been found by evaluating per block metadata of the file system block and a mapping pointer associated with the file system block. Further, the FSCK utility maintains information regarding the type of corruption found at a specific logical offset. Moreover, the FSCK utility maintains information regarding a logical offset range for each inode that has been lost or corrupted. Further, the FSCK utility maintains information regarding whether an inode is completely or partially corrupted.

During the second phase, the FSCK utility attempts to reconnect file system blocks that are determined as lost file system blocks because the file system blocks have not been validated successfully during the first phase. The FSCK utility evaluates per block metadata of each file system block that has not been validated successfully and determines whether a logical offset range indicated by a file system block is recoverable. Further, in such a case, if the logical offset range is determined as recoverable, the FSCK utility determines a set of inodes to which the file system block may be reconnected to. The FSCK utility may need to iterate over per block metadata of a file system block more than once in order to determine a set of inodes that may share the file system block. Further, the FSCK utility maps a top level indirect block first if needed and iterates over a sub tree block hierarchy of the top level indirect block for mapping a lost file system block to the inode of a file. Thus, in at least one embodiment of the current technique, for each file system block that has been determined as a lost file system block, the FSCK utility evaluate each inode of a file system that has been lost or corrupted and based on a logical offset range within each inode that has been lost or corrupted, determines whether the file system block may be reconnected to the inode.

Further, in at least one embodiment of the current technique, if different logical offset ranges are damaged, lost or corrupted within two or more different inodes of a file system indicating a non-overlapping corruption, files of the file system may be completely recovered by the FSCK utility. Further, if a logical offset range is shared by the inode of a file of a file system and at least one snapshot copy of the file and at least two inodes of the file system becomes lost or corrupted, a portion of the shared logical offset range that has been lost, damaged or corrupted indicating an overlapping corruption may not be recovered by the FSCK utility. However, in such a case, if only one inode of a file system has been damaged or lost, the portion of the shared logical offset range that has been lost, damaged or corrupted may be recovered by the FSCK utility. Further, if the overlapping corruption within two or more inodes is of the same type and at the same logical offset, the FSCK utility may recover files of the file system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in recovering files in data storage systems, the method comprising:
    identifying a subset of a set of file system blocks of a file of a file system, wherein the subset of the set of file system blocks are associated with a portion of an inode of the file of the file system, wherein the set of file system blocks of the file are organized in a file system block hierarchy, wherein a file system block includes a data block and an indirect block, wherein a mapping pointer associated with a file system block maps a logical offset of the file system block to a physical block address of the file system block, wherein metadata associated with a file system block includes a logical offset of the file system block and a reference to the inode, wherein mapping information associated with the portion of the inode is missing references to the subset of the set of file system blocks;
    evaluating metadata of each file system block of the subset of the set of file system blocks; and
    based on the evaluation, recovering the portion of the inode of the file by updating mapping information associated with the portion of the inode and updating mapping information for each file system block of the subset of the set of file system blocks.

2. The method of claim 1, wherein a file of the file system is associated with an inode, wherein the file includes a set of file system blocks organized in a file system block hierarchy, wherein a file system block includes a data block and an indirect block.

3. The method of claim 1, wherein a file system block of a file is associated with a per block metadata, wherein the per block metadata includes a logical offset of the file system block and a total reference count of the file system block.

4. The method of claim 1, wherein identifying a set of file system blocks of a file of a file system further comprising:
    iterating over a file system block hierarchy of the inode of the file of the file system for evaluating each file system block of the file system block hierarchy;
    determining whether each file system block is mapped to an inode; and
    determining whether a number of references found for each file system block is equal to a total reference count for each file system block.

5. The method of claim 1, further comprising:
    evaluating a per block metadata of each file system block of the set of file system blocks;
    based on the evaluation, determining whether a logical offset range represented by each file system data block is recoverable; and
    based on the determination, determining an inode that is missing a reference to each file system data block.

6. The method of claim 5, wherein determining whether a logical offset range of a file system block is recoverable further comprising:
    determining whether the logical offset range is shared by an inode of a file and a snapshot inode of a snapshot copy of the file; and
    determining a number of damaged inodes of the file system.

7. The method of claim 1, wherein determining whether a logical offset range of a file system block is recoverable further comprising:
    determining first and second inodes of the file system for recovering a first portion of the first inode and a second portion of the second inode; and
    determining whether the first and second portions overlap.

8. The method of claim 1, further comprising
    updating a per block metadata of each file system block of the set of file system blocks.

9. The method of claim 1, further comprising:
    allocating an indirect block;
    updating mapping information of the indirect block to point to the set of file system blocks; and
    updating mapping information of the portion of the inode of the file to refer to the indirect block.

10. A system for use in recovering files in data storage systems, the system comprising:
    a processor;
    first logic identifying a subset of a set of file system blocks of a file of a file system, wherein the subset of the set of file system blocks are associated with a portion of an inode of the file of the file system, wherein the set of file system blocks of the file are organized in a file system block hierarchy, wherein a file system block includes a data block and an indirect block, wherein a mapping pointer associated with a file system block maps a logical offset of the file system block to a physical block address of the file system block, wherein metadata associated with a file system block includes a logical offset of the file system block and a reference to the inode, wherein mapping information associated with the portion of the inode is missing references to the subset of the set of file system blocks;
    second logic evaluating metadata of each file system block of the subset of the set of file system blocks; and
    third logic recovering, based on the evaluation, the portion of the inode of the file by updating mapping information associated with the portion of the inode and updating mapping information for each file system block of the subset of the set of file system blocks.

11. The system of claim 10, wherein a file of the file system is associated with an inode, wherein the file includes a set of file system blocks organized in a file system block hierarchy, wherein a file system block includes a data block and an indirect block.

12. The system of claim 10, wherein a file system block of a file is associated with a per block metadata, wherein the per block metadata includes a logical offset of the file system block and a total reference count of the file system block.

13. The system of claim 10, wherein identifying a set of file system blocks of a file of a file system further comprising:
    fourth logic iterating over a file system block hierarchy of the inode of the file of the file system for evaluating each file system block of the file system block hierarchy;
    fifth logic determining whether each file system block is mapped to an inode; and sixth logic determining whether a number of references found for each file system block is equal to a total reference count for each file system block.

14. The system of claim 10, further comprising:

fourth logic evaluating a per block metadata of each file system block of the set of file system blocks;

fifth logic determining, based on the evaluation, whether a logical offset range represented by each file system data block is recoverable; and sixth logic determining, based on the determination, an inode that is missing a reference to each file system data block.

15. The system of claim 14, wherein determining whether a logical offset range of a file system block is recoverable further comprising:

seventh logic determining whether the logical offset range is shared by an inode of a file and a snapshot inode of a snapshot copy of the file; and eight logic determining a number of damaged inodes of the file system.

16. The system of claim 10, wherein determining whether a logical offset range of a file system block is recoverable further comprising:

fourth logic determining first and second inodes of the file system for recovering a first portion of the first inode and a second portion of the second inode; and fifth logic determining whether the first and second portions overlap.

17. The system of claim 10, further comprising fourth logic updating a per block metadata of each file system block of the set of file system blocks.

18. The system of claim 10, further comprising:

fourth logic allocating an indirect block;

fifth logic updating mapping information of the indirect block to point to the set of file system blocks; and sixth logic updating mapping information of the portion of the inode of the file to refer to the indirect block.

* * * * *